US010952125B2

(12) United States Patent
Lee et al.

(10) Patent No.: US 10,952,125 B2
(45) Date of Patent: Mar. 16, 2021

(54) METHOD AND DEVICE FOR CONFIGURING SIGNALING CATEGORY FOR ACCESS CONTROL MECHANISM IN WIRELESS COMMUNICATION SYSTEM

(71) Applicant: LG ELECTRONICS INC., Seoul (KR)

(72) Inventors: Youngdae Lee, Seoul (KR); Jaehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/476,515

(22) PCT Filed: Jan. 5, 2018

(86) PCT No.: PCT/KR2018/000249
§ 371 (c)(1),
(2) Date: Jul. 8, 2019

(87) PCT Pub. No.: WO2018/128459
PCT Pub. Date: Jul. 12, 2018

(65) Prior Publication Data
US 2019/0380086 A1 Dec. 12, 2019

Related U.S. Application Data

(60) Provisional application No. 62/443,029, filed on Jan. 6, 2017.

(51) Int. Cl.
*H04W 48/08* (2009.01)
*H04W 48/02* (2009.01)

(52) U.S. Cl.
CPC ........... *H04W 48/08* (2013.01); *H04W 48/02* (2013.01)

(58) Field of Classification Search
CPC ..... H04W 48/10; H04W 48/02; H04W 12/08; H04W 28/0284; H04W 48/06;
(Continued)

(56) References Cited

U.S. PATENT DOCUMENTS 8,938,233 B2 * 1/2015 Hsu .................. H04W 4/70
455/432.1
9,264,979 B2 * 2/2016 Fong .................. H04W 48/12
(Continued)

FOREIGN PATENT DOCUMENTS

CN 102300285 12/2011
CN 102612112 7/2012
(Continued)

OTHER PUBLICATIONS

PCT International Application No. PCT/KR2018/000249, International Search Report dated Apr. 10, 2018, 6 pages.
(Continued)

*Primary Examiner* — Matthew C Sams
(74) *Attorney, Agent, or Firm* — Lee Hong Degerman Kang Waimey

(57) ABSTRACT

The expansion of a category-based access control mechanism so that same may cover the conventional access control mechanism is being discussed in new radio access technology (NR). Accordingly, the present invention proposes that the category-based access control mechanism be performed for signaling as well. Specifically, a user equipment (UE): receives a configuration associated with a signaling category from a network; determines a category corresponding to a specific signaling on the basis of the configuration associated with a signaling category; and determines whether access to a cell of the category corresponding to a specific signaling is blocked.

14 Claims, 7 Drawing Sheets

(58) Field of Classification Search
CPC ....... H04W 48/12; H04W 4/70; H04W 76/27; H04W 28/0215; H04W 48/08
See application file for complete search history.

(56) References Cited

U.S. PATENT DOCUMENTS

| | | | | |
|---|---|---|---|---|
| 2012/0307632 | A1* | 12/2012 | Guo | H04W 48/06 370/230 |
| 2013/0040605 | A1* | 2/2013 | Zhang | H04W 48/06 455/411 |
| 2013/0045706 | A1* | 2/2013 | Hsu | H04W 4/70 455/404.1 |
| 2014/0029530 | A1* | 1/2014 | Kim | H04W 48/10 370/329 |
| 2016/0050615 | A1* | 2/2016 | Fong | H04W 48/12 455/411 |
| 2018/0199261 | A1* | 7/2018 | Lee | H04W 48/16 |

FOREIGN PATENT DOCUMENTS

| | | |
|---|---|---|
| CN | 103733688 | 4/2014 |
| CN | 104871603 | 8/2015 |
| EP | 2654346 | 10/2013 |
| KR | 1020140033230 | 3/2014 |
| KR | 1020160135099 | 11/2016 |
| WO | 2012093583 | 7/2012 |
| WO | 2013020778 | 2/2013 |
| WO | WO-2013136657 A1 * | 9/2013 ........... H04B 7/2606 |
| WO | 2016003140 | 1/2016 |
| WO | WO-2017043903 A1 * | 3/2017 ........... H04W 48/02 |
| WO | 2018128458 | 7/2018 |

OTHER PUBLICATIONS

European Patent Office Application Serial No. 18736596.0, Search Report dated Oct. 28, 2019, 9 pages.
LG Electronics, "Discussion on Access Control", 3GPP TSG-SA WG1 Meeting #76, S1-163276, Nov. 2016, 9 pages.
LG Electronics, "Access category based access barring for RRC_IDLE and RRC_INACTIVE", 3GPP TSG RAN WG2 NR AH Meeting #2, R2-1707138, Jun. 2017, 3 pages.
LG Electronics, "Access Control for New RAT", 3GPP TSG RAN WG2 Meeting #96, R2-168418, Nov. 2016, 2 pages.
Japan Patent Office Application No. 2019-536964, Office Action dated Oct. 6, 2020, 4 pages.
Huawei, HiSilicon, "Access control in NR", R2-168256, 3GPP TSG-RAN WG2 Meeting #96, Nov. 2016, 4 pages.
The State Intellectual Property Office of the People's Republic of China Application Serial No. 201880015579.5, Office Action dated Dec. 30, 2020, 8 pages.

* cited by examiner

METHOD AND DEVICE FOR CONFIGURING SIGNALING CATEGORY FOR ACCESS CONTROL MECHANISM IN WIRELESS COMMUNICATION SYSTEM

CROSS-REFERENCE TO RELATED APPLICATIONS

This application is the National Stage filing under 35 U.S.C. 371 of International Application No. PCT/KR2018/000249, filed on Jan. 5, 2018, which claims the benefit of U.S. Provisional Application No. 62/443,029, filed on Jan. 6, 2017, the contents of which are hereby incorporated by reference herein in its entirety.

BACKGROUND OF THE INVENTION

Field of the Invention

The present invention relates to wireless communication and, more particularly, to a method and device for configuring signaling categories for an access control mechanism in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In a specific situation, it is preferable to prevent a user equipment (UE) from attempting access (including an urgent call attempt) or responding to paging in a specific area of a public land mobile network (PLMN). Such a situation may occur in the emergency situation or when one of two or more co-located PLMNs fails. A broadcasting message has to indicate the level or category of a subscriber blocked from network access and has to be available in a cell unit. The use of such equipment helps a network service provider prevent overload of access channels in a critical situation. Under a normal operating condition, use of access control is not attempted. Access control between circuit-switched (CS) and packet-switched (PS) domains has to be distinguished from each other.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Recently, various types of access control mechanisms are in use in the 3GPP LTE. The access control mechanism may also be used for NR. However, to perform access control more efficiently in the NR, integration of various types of access control mechanisms used in the 3GPP LTE is under discussion.

SUMMARY OF THE INVENTION

The present invention provides a method and device for configuring signaling categories for an access control mechanism in a wireless communication system. The present invention provides a method and device for performing access control by a UE according to the signaling category configured by the network.

In an aspect, a method for performing category-based access control by a user equipment (UE) in a wireless communication system is provided. The method includes receiving a configuration associated with a signaling category from a network, determining a category corresponding to a specific signaling based on the configuration associated with the signaling category, and determining whether access to a cell of the category corresponding to the specific signaling has been barred.

In another aspect, a user equipment (UE) in a wireless communication system is provided. The UE includes a memory, a transceiver, and a processor connected to the memory and the transceiver. The processor is configured to control the transceiver to receive a configuration associated with a signaling category from a network, determine a category corresponding to a specific signaling based on the configuration associated with the signaling category, and determine whether access to a cell of the category corresponding to the specific signaling has been barred.

Category-based access control mechanism can also be applied to various types of signaling.

DESCRIPTION OF EXEMPLARY EMBODIMENTS

Figure 1:
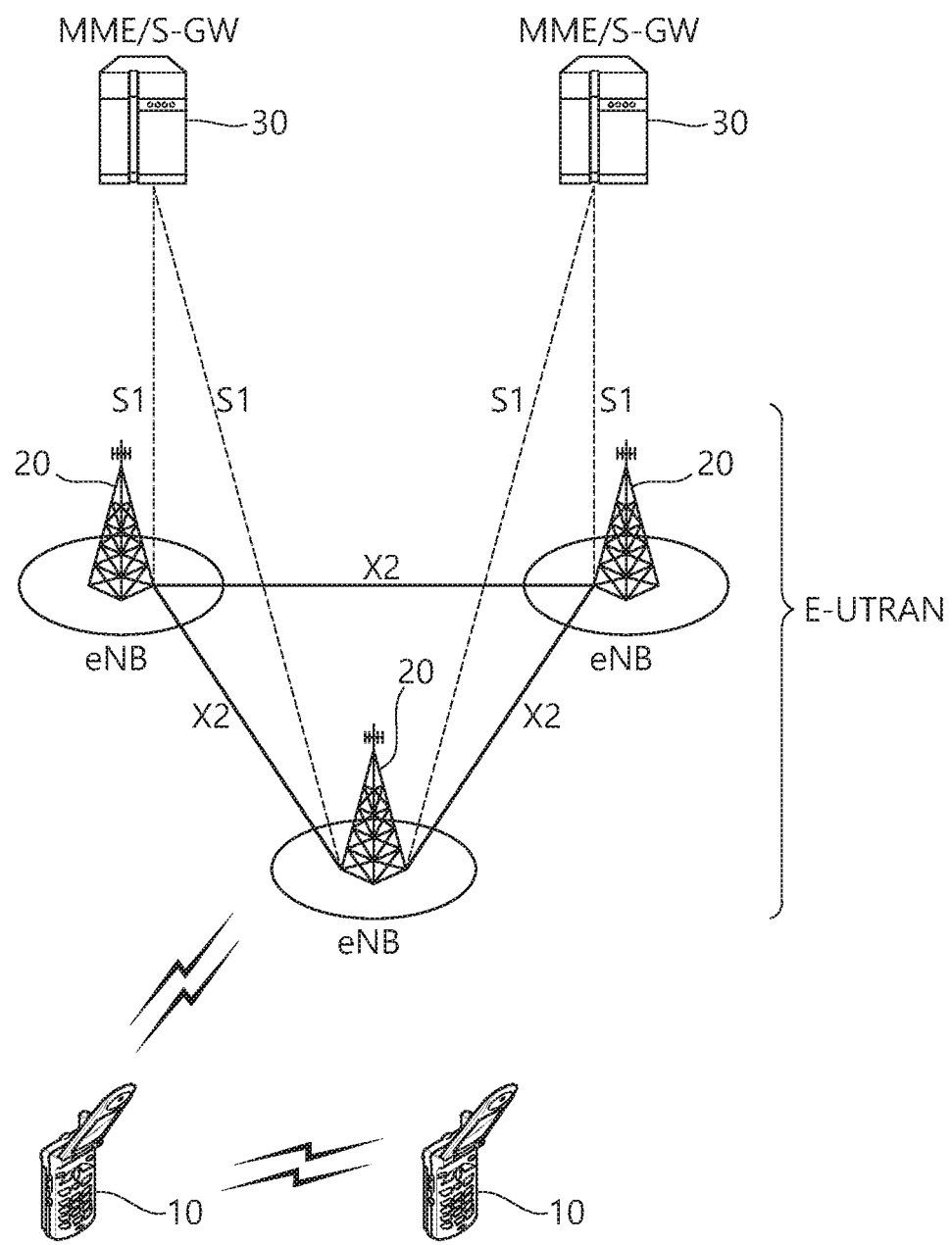
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
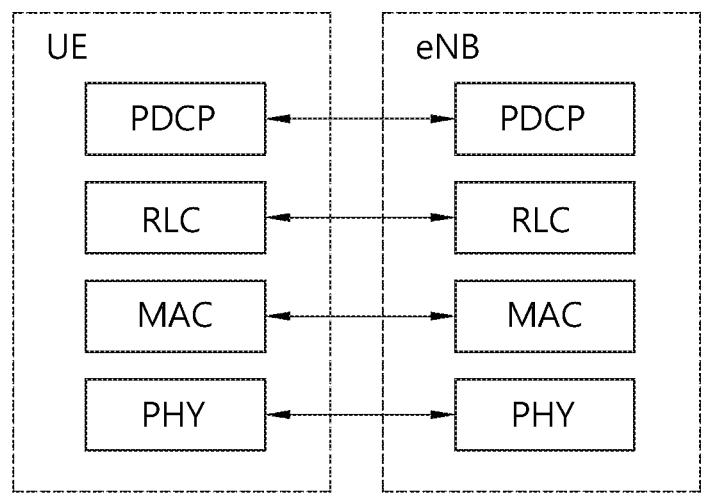
FIG. 2 shows a block diagram of a user plane protocol stack of an LTE system.
Figure 3:
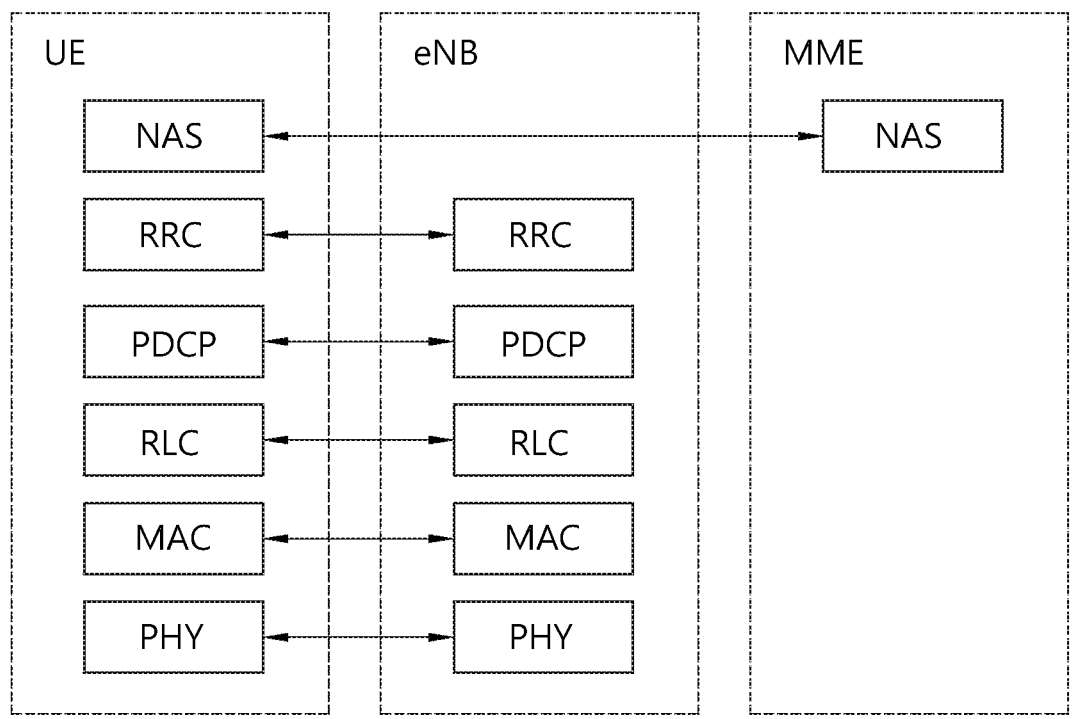
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain One subframe, which is 1ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multi-cast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Hereinafter, access control mechanisms of 3GPP LTE are described.

First, access class barring (ACB) is described. If the UE is a member of at least one access class which corresponds to the permitted classes as signaled over the air interface, and the access class is applicable in the serving network, access attempts are allowed. Additionally, in the case of the access network being UTRAN the serving network can indicate that UEs are allowed to respond to paging and perform location registration, even if their access class is not permitted. Otherwise access attempts are not allowed. Also, the serving network can indicate that UEs are restricted to perform location registration, although common access is permitted. If the UE responded to paging, it shall follow the normal defined procedures and react as specified to any network command. The network operator can take the network load into account when allowing UEs access to the network.

Access classes are applicable as follows:

Classes 0-9: Home PLMN (HPLMN) and visited PLMN (HPLMN);

Classes 11 and 15: HPLMN only if the equivalent HPLMN (EHPLMN) list is not present or any EHPLMN;

Classes 12, 13, 14: HPLMN and VPLMNs of home country only. For this purpose the home country is defined as the country of the mobile country code (MCC) part of the international mobile subscriber identity (IMSI).

Any number of these classes may be barred at any one time.

In the case of multiple core networks sharing the same access network, the access network shall be able to apply ACB for the different core networks individually.

The following is the requirements for ACB.

The serving network shall be able to broadcast mean durations of access control and barring rates (e.g. percentage value) that commonly applied to access classes 0-9 to the UE. The same principle as in UMTS is applied for access classes 11-15.

E-UTRAN shall be able to support access control based on the type of access attempt (i.e. mobile originating (MO) data or MO signaling), in which indications to the UEs are broadcasted to guide the behaviour of UE. E-UTRAN shall be able to form combinations of access control based on the type of access attempt e.g. MO and mobile terminating (MT), MO, or location registration. The mean duration of access control and the barring rate are broadcast for each type of access attempt (i.e. MO data or MO signaling).

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed. Otherwise, the access attempt is not allowed. If the access attempt is not allowed, further access attempts of the same type are then barred for a time period that is calculated based on the mean duration of access control provided by the network and the random number drawn by the UE.

The serving network shall be able to indicate whether or not a UE shall apply ACB for short message service (SMS) access attempts in SMS over SGs, SMS over IP multimedia subsystem (IMS) (SMS over IP), and SMS over S102. This indication is valid for access classes 0-9 and 11-15.

The serving network shall be able to indicate whether or not a UE shall apply ACB for multimedia telephony service (MMTEL) voice access attempts. This indication is valid for access classes 0-9 and 11-15.

The serving network shall be able to indicate whether or not a UE shall apply ACB for MMTEL video access attempts. This indication is valid for access classes 0-9 and 11-15.

Service specific access control (SSAC) is described. Additionally to the above ACB, in E-UTRAN, it shall be possible to support a capability called SSAC to apply independent access control for MMTEL for MO session requests from idle-mode and connected-mode. The serving network shall be able to indicate whether or not a UE subject to SSAC shall also apply ACB. Evolved packet system (EPS) shall provide a capability to assign a service probability factor and mean duration of access control for each of MMTEL voice and MMTEL video. The following is the requirements for SSAC.

assign a barring rate (percentage) commonly applicable for access classes 0-9 assign a flag barring status (barred/unbarred) for each access class in the range 11-15.

SSAC shall not apply to access class 10.

SSAC can be provided by the VPLMN based on operator policy without accessing the HPLMN.

SSAC shall provide mechanisms to minimize service availability degradation (i.e. radio resource shortage) due to the mass simultaneous MO session requests and maximize the availability of the wireless access resources for non-barred services.

The serving network shall be able to broadcast mean durations of access control, barring rates for access classes 0-9, barring status for access class in the range 11-15 to the UE.

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed. Otherwise, the access attempt is not allowed. If the access attempt is not allowed, further access attempts of the same type are then barred for a time period that is calculated based on the mean duration of access control provided by the network and the random number drawn by the UE.

Extended access barring (EAB) is described. EAB is a mechanism for the operator(s) to control MO access attempts from UEs that are configured for EAB in order to prevent overload of the access network and/or the core network. In congestion situations, the operator can restrict access from UEs configured for EAB while permitting access from other UEs. UEs configured for EAB are considered more tolerant to access restrictions than other UEs. When an operator determines that it is appropriate to apply EAB, the network broadcasts necessary information to provide EAB control for UEs in a specific area. The following is the requirements for EAB.

UE is configured for EAB by the HPLMN.

EAB shall be applicable to all 3GPP radio access technologies (RATs).

EAB shall be applicable regardless of whether the UE is in a HPLMN or a VPLMN.

A network may broadcast EAB information.

EAB information shall define whether EAB applies to UEs within one of the following categories:
  a) UEs that are configured for EAB;
  b) UEs that are configured for EAB and are neither in their HPLMN nor in a PLMN that is equivalent to it;
  c) UEs that are configured for EAB and are neither in the PLMN listed as most preferred PLMN of the country where the UE is roaming in the operator-defined PLMN selector list on the subscriber identification module (SIM)/universal SIM (USIM), nor in their HPLMN nor in a PLMN that is equivalent to their HPLMN EAB information shall also include extended barring information for access classes 0-9.

A UE configured for EAB shall use its allocated access class(es), when evaluating the EAB information that is broadcast by the network, in order to determine if its access to the network is barred.

If a UE that is configured for EAB initiates an emergency call or is a member of an access class in the range 11-15 and that access class is permitted by the network, then the UE shall ignore any EAB information that is broadcast by the network.

If the network is not broadcasting the EAB information, the UE shall be subject to ACB.

If the EAB information that is broadcast by the network does not bar the UE, the UE shall be subject to ACB.

In the case of multiple core networks sharing the same access network, the access network shall be able to apply the EAB for the different core networks individually.

Overriding extended access barring is a mechanism for the operator to allow UEs that are configured for EAB to access the network under EAB conditions. The following requirements apply.

The UE configured with EAB may be configured by the HPLMN with a permission to override EAB.

For a UE configured with the permission to override EAB, the user or application (upper layers in UE) may request the UE to activate PDN connection(s) for which EAB does not apply.

The UE shall override any EAB restriction information that is broadcast by the network as long as it has an active PDN connection for which EAB does not apply.

Application specific congestion control for data communication (ACDC) is described. ACDC is an access control mechanism for the operator to allow/prevent new access attempts from particular, operator-identified applications in the UE. The network can prevent/mitigate overload of the access network and/or the core network. This feature is optional.

ACDC categories are ranked in the order of the probability of being restricted. The operator assigns an application that needs minimal restriction to a higher ranked ACDC category. This reduces the impact to access attempts from such applications. Structuring controls in this way ensures that the same principle holds for roaming UEs, if the visited operator chooses to make ACDC applicable to roamers.

There may be many applications on a UE that are not assigned an ACDC category. Such applications should be treated by the UE as part of the lowest ranked ACDC category. If the operator requires differentiation with respect to these uncategorized applications, the operator should avoid assigning applications to the lowest ranked ACDC category. The following is the requirements for ACDC.

This feature shall be applicable to UTRAN and E-UTRAN.
This feature shall be applicable to UEs that are not a member of one or more of access classes 11 to 15.
The home network shall be able to configure a UE with at least four ACDC categories to each of which particular, operator-identified applications are associated. The categories shall be ranked in order of the probability of being restricted.
The serving network shall be able to broadcast, in one or more areas of the RAN, control information per each ACDC category, indicating e.g. barring rates, and whether a roaming UE shall be subject to ACDC control.
The UE shall be able to control whether or not access attempt for certain application is allowed, based on this broadcast control information and the configuration of categories in the UE.
The serving network shall be able to simultaneously indicate ACDC with other forms of access control.
When both ACDC and ACB controls are indicated, ACDC shall override ACB.
In the case of multiple core networks sharing the same access network, the access network shall be able to apply ACDC for the different core networks individually. For the mitigation of congestion in a shared RAN, barring rates should be set equal for all participating operators.

5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

Figure 4:
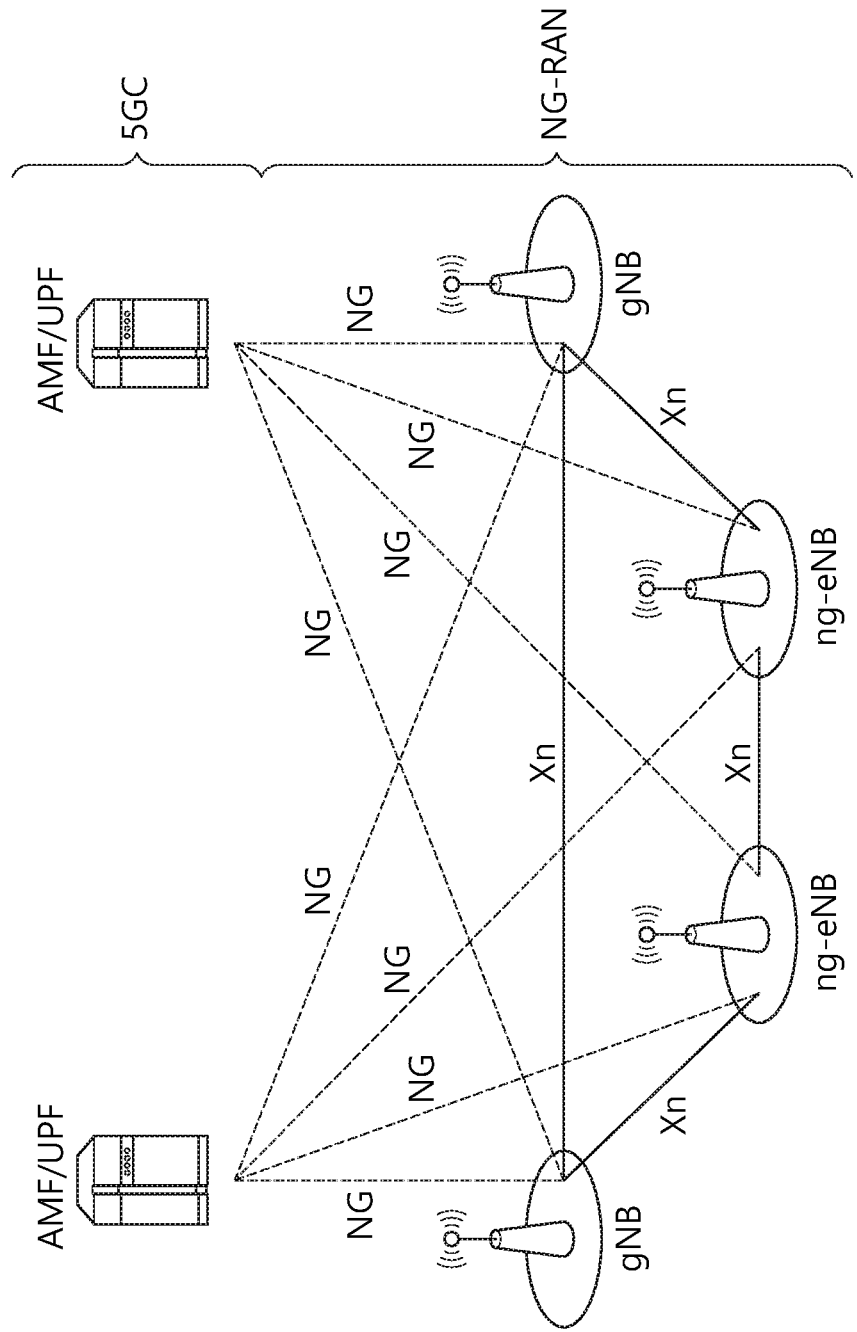
FIG. 4 shows an NG-RAN architecture.

FIG. 4 shows an NG-RAN architecture. Referring to FIG. 4, the NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN. More specifically, the gNBs and ng-eNBs are connected to the access and mobility management function (AMF) by means of the NG-C interface and to the user plane function (UPF) by means of the NG-U interface.

The gNB and ng-eNB host the following functions:
Functions for radio resource management: Radio bearer control, radio admission control, connection mobility control, dynamic allocation of resources to UEs in both uplink and downlink (scheduling);
Internet protocol (IP) header compression, encryption and integrity protection of data;
Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or operations & maintenance (O&M));
Measurement and measurement reporting configuration for mobility and scheduling;
Transport level packet marking in the uplink;
Session management;
Support of network slicing;
QoS flow management and mapping to data radio bearers;
Support of UEs in RRC_INACTIVE state;
Distribution function for non-assess stratum (NAS) messages;
Radio access network sharing;
Dual connectivity;
Tight interworking between NR and E-UTRA.

The AMF hosts the following main functions:
NAS signaling termination;
NAS signaling security;
AS security control;
Inter CN node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.

The UPF hosts the following main functions:
Anchor point for Intra-/Inter-radio access technology (RAT) mobility (when applicable);
External protocol data unit (PDU) session point of interconnect to data network;
Packet routing & forwarding;
Packet inspection and user plane part of policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink traffic verification (service data flow (SDF) to QoS flow mapping);

Downlink packet buffering and downlink data notification triggering.

The SMF hosts the following main functions:

Session management;

UE IP address allocation and management;

Selection and control of UP function;

Configures traffic steering at UPF to route traffic to proper destination;

Control part of policy enforcement and QoS;

Downlink data notification.

As described above, the E-UTRAN controls access of different services based on various access control mechanisms such as a combination of ACB, ACB skip, SSAC, EAB, and ACDC. However, as various access control mechanisms are designated, complexity due to partial interaction between different mechanisms may increase for both the UE-side and the eNB/gNB-side. Therefore, another mechanism is needed, which avoids device complexity and interaction with other mechanisms.

In NR, the concept of category used in the ACDC may be extended to include ACB (call type such as emergency access, high priority access, or MT access), ACB skip, SSAC (MMTEL voice, MMTEL video, SMS) and EAB. As described above, in the case of ACDC, different applications are classified into one or more categories with respect to MO data. An eNB broadcasts barring information for each category and accordingly, when a UE accesses a cell by using a specific application, selects a category to which the corresponding specific application belongs.

Similarly, one or more call type like emergency access and high priority access and/or low priority indicator (namely access tolerant to delay), a different indicator from the NAS such as EAB indicator may also seem to belong to one or more categories. For example, one network may classify high priority access and emergency access as one category and may consider access tolerant to delay and EAB to be another independent category. Other network may regard them as one category. gNB may control different categories that have a different barring possibility or the same possibility of being barred.

According to the method above, NR may support complete flexibility in access control and future assurance mechanism. When a new requirement for access control is needed, the new requirement may be realized by re-categorization or as introducing one or more new categories. For example, if D2D or MBMS is introduced in NR phase 2, a new service/function may be classified as a new category or one or more existing categories.

As described above, if the category concept is used to provide an access control mechanism in NR, a network has to have one or more categories for access control. As described above, various applications, various services (for example, MMTEL voice, MMTEL video, SMS), various call types (for example, emergency access, high priority access, MT access), various indicators from NAS (for example, low priority indicator, EAB indication) may be subject to categorization in the network.

Meanwhile, in the ACDC of the LTE, categorization of only MO data has been considered, but categorization of signaling and MT access has not been done. In other words, when only an integrated category-based access control mechanism is used, it is uncertain which access control mechanism may be applied for signaling in which the application layer does not intervene.

The present invention provides an access control method that solves the aforementioned problem. The present invention proposes to extend the concept of category not only to the MO data but also to signaling and MT access. For example, MO access (namely MO signaling) for the NAS procedure may be classified as one category. Similarly, mobility management (MM) procedure may be classified as one category, and session management (SM) procedure may be classified as a different category for each slice. Also, different RRC procedures may be classified as one or more categories. For example, an RAN-based area update procedure may trigger UL access for one category while a request for on-demand system information (SI) may trigger UL access for other category.

Categorization intends to control UL access of different categories and differentiate categories having different access probabilities for each cell. Therefore, each cell may provide a barring parameter for one or more categories. Considering the conventional mechanism, a different access probability may be given according to the barring parameter such as the barring factor (%), barring time (ms), and bitmap. In the LTE, the barring factor and barring time are used for ACB, SSAC, and ACDC. An eNB may broadcast independent barring factor/time for each MMTEL service or ACDC category. A bitmap is used in the EAB of the LTE. An eNB may control EAB access based on the access level stored in each UE. The network may configure the barring factor/time or bitmap for each category. Accordingly, flexibility may be provided, and various requirements for access control may be supported for each use case.

More specifically, according to one embodiment of the present invention, a network entity may configure one or more categories and transmit information about the configured categories to a UE. The information about the configured categories may include barring information of the categories. A UE may receive the information about the configured categories and classify signaling as one category. And then, if the UE initiates an access procedure to a cell to transmit or receive signaling in the E-UTRA or NR, the UE may determine by using the barring information of categories whether access to the corresponding cell is barred (or prohibited or is not allowed). If the UE considers that access to the corresponding cell is not barred, the UE may perform UL transmission for the access procedure and transmit or receive signaling afterwards.

According to one embodiment of the present invention, the category may also be called by other terms such as a signaling category, group, or level. According to one embodiment of the present invention, the signaling may include at least one of RRC message (or RRC procedure), NAS message (or NAS procedure), L2 control information such as a MAC control element (or MAC procedure), RLC control PDU (or RLC procedure), PDCP control PDU (or PDCP procedure), and L1 control information such as UL control information (or L1 procedure). The signaling may include at least one of a specific message, specific procedure, specific MAC control element, specific PDU, and specific information. According to one embodiment of the present invention, the access procedure may include at least one of a random access procedure, UL transmission procedure, scheduling request (SR) procedure, RRC connection establishment procedure, RRC connection resumption procedure, RRC connection re-establishment procedure, RRC state transition procedure, and RAN area update procedure.

According to one embodiment of the present invention, the barring information for categories may include at least one or more of a barring factor (i.e. barring probability), barring time or bitmap. Each information that may be included in the barring information for categories may be applied as follows.

If barring information for categories includes a barring factor, a UE may draw a random number and compare the random number with the barring factor. Depending on whether the random number is larger than the barring factor, the UE may determine whether access to the corresponding cell is barred (or prohibited or is not allowed).

If barring information for categories includes barring time, a UE may start a timer when the UE determines that access to the corresponding cell has been barred. If the timer is started, the UE may consider that access to the corresponding cell has been barred until the corresponding timer expires according to the barring time.

If barring information for categories includes a bitmap, a UE may check the bit corresponding to the UE, namely 0 or 1. Depending on the bit value, the UE may determine whether access to the corresponding cell is barred (or prohibited or is not allowed). Each bit of the bitmap may correspond to each access level. By using the access level stored in the UE, the UE may determine which bit of the bitmap corresponds to the UE.

One embodiment of the access procedure according to the present invention is as follows.

1. A network entity configures one or more categories. The network entity may be one of eNB, gNB, server, MME, AMF, and SMF. Each category may include one or more of the following.

A. Different applications
B. Different services (for example, MMTEL voice, MMTEL video, SMS)
C. Different call types (for example, emergency call, high priority call, MT call, MO signaling, and MO call)
D. Different establishment causes (for example, emergency access, high priority access, MT access, and MO signaling)
E. Indicator from different NAS layers (for example, low priority indicator and EAB indicator)
F. Signaling procedure (for example, NAS procedure or message, RRC procedure or message)

2. A network entity informs a UE of how categories are configured. In other words, a network entity informs a UE of a mapping relationship describing how at least one of the aforementioned application, service, call type, establishment cause, indicator from the NAS layer and/or signaling procedure is mapped to one category. In what follows, one example of a mapping relationship between a category and an application, service, call type, establishment cause, indicator from the NAS layer and/or signaling procedure is described.

A. Category 1: emergency call, high priority access
B. Category 2: MT call, MT access
C. Category 3: RRC message/procedure for a request (namely "Other SI" request) of on-demand system information
D. Category 4: RRC connection establishment procedure, RRC connection re-establishment procedure, RRC connection resumption procedure, MMTEL voice, MMTEL video, SMS
E. Category 5: tracking area update message/procedure, RAN area update message/procedure, vehicle-to-everything (V2X) service
F. Category 6: social networking service (SNS) application, map application, message application
G. Category 7: EAB indicator
H. Category 8: Low priority indicator, access tolerant to delay
I. Category 9: Device-to-device (D2D) service, MBMS service Referring to the mapping relationship between the category and the application, service, call type, establishment cause, indicator from the NAS layer and/or signaling procedure, it may be known that as an application, service, call type, establishment cause, indicator from the NAS layer and/or signaling procedure is mapped to a higher category, access has to be limited to a minimum for the application, service, call type, establishment cause, indicator from the NAS layer and/or signaling procedure.

Figure 5:
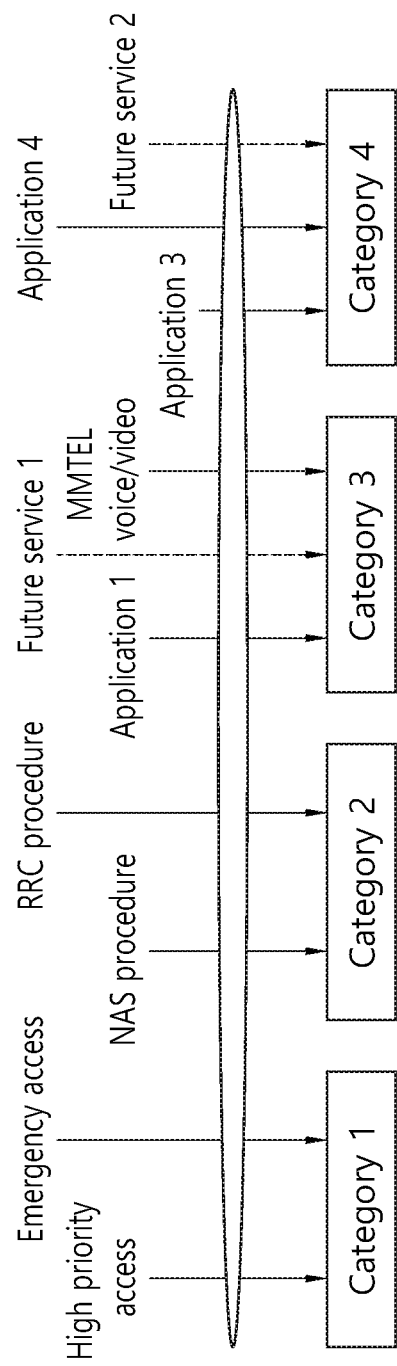
FIG. 5 illustrates a mapping relationship between a category and an application, service, call type, establishment cause, indicator from the NAS layer and/or signaling procedure according to one embodiment of the present invention.

FIG. 5 illustrates a mapping relationship between a category and an application, service, call type, establishment cause, indicator from the NAS layer and/or signaling procedure according to one embodiment of the present invention. Referring to FIG. 5, high priority access and emergency access are mapped to the category 1. NAS procedure and RRC procedure are mapped to the category 2. Application 1, future service 1, and MMTEL voice/video are mapped to the category 3. Application 3, application 4, and future service 2 are mapped to the category 4. The category 1 corresponds to an important application, service, call type, establishment cause, indicator from the NAS layer and/or signaling procedure for which access has to be limited to a minimum while the category 4 corresponds to an application, service, call type, establishment cause, indicator from the NAS layer and/or signaling procedure that are tolerant to access limitation.

3. A core network entity of the network informs a base station (for example, gNB or eNB) of one or more categories and/or whether access to a cell is barred.

4. A base station (for example, gNB or eNB) determines barring information of one or more categories for a UE, cell, transmission and reception point (TRP), transmission point (TP), distributed unit (DU) or beam.

5. A base station may broadcast barring information of one or more categories through the minimum SI. The minimum SI may include basic information required for the initial access to a cell and information for obtaining other SI provided periodically or on-demand Or, the base station may broadcast barring information of one or more categories through a different SI (namely SI other than the minimum SI). Or, the base station may transmit barring information of one or more categories to one or more UEs through UE-dedicated signaling such as an RRC message on the DCCH.

For example, the barring information for categories (for example, barring information used for ATTACH, tracking area update, emergency access, MT access or access for SI request) used for a UE in the RRC_IDLE state may always be broadcast through the minimum SI, and the barring information for the remaining categories may be broadcast through other SI. Also, barring information for categories used for a UE in the RRC_INACTIVE or RRC_CONNECTED state may be transmitted for each UE through dedicated signaling when, for example, the UE enters the RRC_INACTIVE or RRC_CONNECTED state or the UE employs an on-demand SI transmission mechanism.

The barring information for one or more categories may be signaled with respect to one or more RRC states (for example, RRC_IDLE, RRC_CONNECTED, RRC_INACTIVE, and RRC_ACTIVE). In other words, different barring information may be signaled for different RRC states even if the same category is applied. Also, the barring information for one or more categories may be signaled with respect to each UE, each cell, each TRP, each TP, each DU, or each beam.

6. A UE receives barring information for one or more categories from a base station. The barring information of one or more categories may correspond to the current RRC state.

7. A UE determines a specific category corresponding to signaling according to category configuration information configured by a network entity, initiates an access procedure for the corresponding specific category, and determines whether access to the corresponding specific category is barred. For example, if the UE determines access for high priority access, the UE selects a category mapped to the high priority access. Also, if the UE determines access for MT call, the UE selects a category mapped to the MT call. Or, if the UE determines access for a request of on-demand SI, the UE selects a category mapped to the request of the on-demand SI.

At this time, one of the RRC layer/NAS layer/upper layer of the UE determines a specific category corresponding to signaling, initiates an access procedure for the corresponding specific category, and determines whether to bar access to the corresponding specific category.

1) The RRC layer of a UE may determine a specific category corresponding to signaling, initiate an access procedure for the corresponding specific category, and determine whether to bar access to the corresponding specific category. This operation is similar to ACB, ACDC, and EAB modeling of the LTE, where the NAS layer informs the RRC layer of access type information such as a call type, ACDC category, and EAB indication. The RRC layer determines based on the information received from the NAS layer whether access to a cell has been barred with respect to a specific category.

2) The NAS layer of a UE may determine a specific category corresponding to signaling, initiate an access procedure for the corresponding specific category, and determine whether to bar access to the corresponding specific category. At this time, the RRC layer informs the NAS layer of the category configuration information received from a network entity and/or barring information for the categories. Next, the NAS layer determines a category and determines based on the barring information received from the RRC layer whether access to a cell has been barred with respect to the specific category.

3) The upper layer (for example, MMTEL of SSAC) of a UE may determine a specific category corresponding to signaling, initiate an access procedure for the corresponding specific category, and determine whether to block access to the corresponding specific category. This operation is similar to the SSAC modeling of the LTE, where the RRC layer informs the upper layer of the barring information received from a base station. The upper layer determines a category and determines based on the barring information received from the RRC layer whether access to a cell has been barred with respect to the specific category.

8. When a UE determines whether to bar access to a specific category, the UE uses barring information for categories received from a base station.

If barring information for categories includes a barring factor, the UE may draw a random number and compares the random number with the barring factor. Depending on whether the random number is larger than the barring factor, the UE may determine whether access to the corresponding cell is barred (or prohibited or is not allowed).

If barring information for categories includes barring time, the UE may start a timer when the UE determines that access to the corresponding cell has been barred. If the timer is started, the UE may consider that access to the corresponding cell has been barred until the corresponding timer expires according to the barring time.

If barring information for categories includes a bitmap, the UE may check the bit corresponding to the UE, namely 0 or 1. Depending on the bit value, the UE may determine whether access to the corresponding cell is barred (or prohibited or is not allowed). Each bit of the bitmap may correspond to each access level. By using the access level stored in the UE, the UE may determine which bit of the bitmap corresponds to the UE.

9. If the UE considers that access to a cell has been barred, the UE may start a timer. When the timer is running, the UE may consider that access to the corresponding cell has been barred until the corresponding timer expires.

If the UE determines that access to a cell is not barred, the UE may perform UL transmission for the access procedure. In other words, if the UE determines that access to the cell is not barred, the UE may configure a message of the access procedure and transmit the message on the UL.

Figure 6:
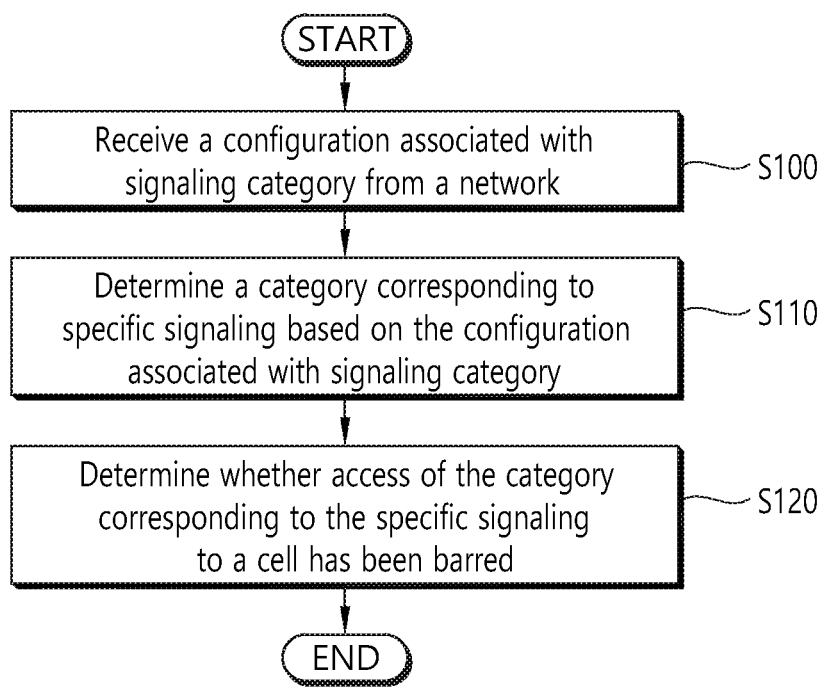
FIG. 6 illustrates a method for performing category-based access control by a UE according to one embodiment.

FIG. 6 illustrates a method for performing category-based access control by a UE according to one embodiment. The embodiment of the present invention described above may be applied to the present embodiment.

In step S100, a UE receives configuration associated with a signaling category from a network. The network may correspond to one of eNB, gNB, server, MME, AMF, or SMF. According to the configuration associated with the signaling category, a mapping relationship between a category and an application, service, call type, establishment cause, indicator from the NAS layer and/or signaling procedure may be defined. As one example, according to the configuration of the signaling category, the RRC message or procedure for requesting on-demand system information may be mapped to a category with higher priority than the RRC connection establishment procedure, RRC connection re-establishment procedure, or RRC connection resumption procedure. As another example, according to the configuration of the signaling category, the RRC connection establishment procedure, RRC connection re-establishment procedure, or RRC connection resumption procedure may be mapped to a category with higher priority than the RAN area update procedure.

In step S110, the UE determines a category corresponding to specific signaling based on the configuration associated with the signaling category. The specific signaling may include at least one of RRC message (or RRC procedure), NAS message (or NAS procedure), L2 control information such as MAC control element (or MAC procedure), RLC control PDU (or RLC procedure), a PDCP control PDU (or PDCP procedure), and L1 control information such as UL control information (or L1 procedure). The specific signaling may include at least one of a specific message, specific procedure, specific MAC control element, specific PDU, and specific information. The RRC layer of the UE may determine the category corresponding to the specific signaling. Or, the NAS layer of the UE may determine the category corresponding to the specific signaling and indicate the category for the RRC layer of the UE.

In step S120, the UE determines whether access to a cell of the category corresponding to the specific signaling has been barred. To this purpose, the UE may receive barring information for at least one category from the network. By using the barring information, the UE may determine whether access to the cell of the category corresponding to the specific signaling has been barred. The barring information may include at least one of a barring factor, barring time or bitmap. The barring information may be broadcast through the system information or through the RRC message on the DCCH.

If it is determined that access to the cell has not been barred, the UE performs an access procedure for performing the specific signaling. The access procedure may include at least one of random access procedure, UL transmission procedure, SR procedure, RRC connection establishment procedure, RRC connection resumption procedure, RRC connection re-establishment procedure, RRC state transition procedure, or RAN area update procedure.

Figure 7:
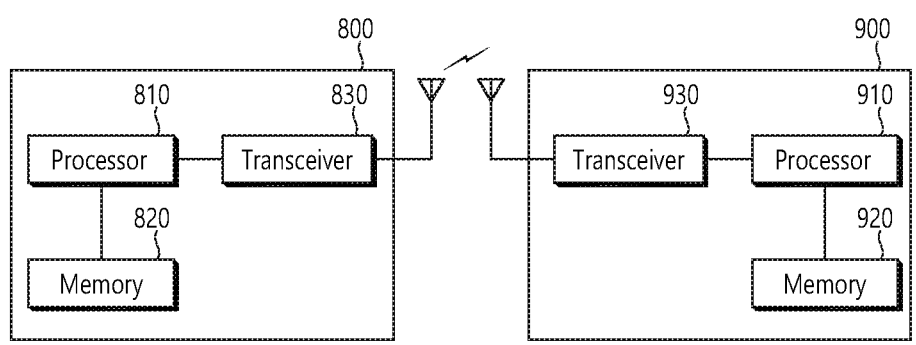
FIG. 7 shows a wireless communication system to implement an embodiment of the present invention.

FIG. 7 shows a wireless communication system to implement an embodiment of the present invention.

A network entity 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing category-based access control by a wireless device configured to operate in a wireless communication system, the method comprising:
receiving barring information mapped to multiple signaling categories from a network,
wherein each of the multiple signaling categories corresponds to one or more procedures, and
wherein the one or more procedures includes one or more non-access stratum (NAS) procedures and one or more radio resource control (RRC) procedures;
initiating an update procedure related to a radio access network (RAN) based area, among the one or more procedures;
selecting, by a RRC layer of the wireless device, a signaling category, among the multiple signaling categories, corresponding to the initiation of the update procedure related to the RAN based area;
performing the category-based access control for the selected signaling category based on the barring information; and
transmitting, to the network, a RRC message for the update procedure related to the RAN based area upon that the update procedure related to the RAN based area is not barred as a result of the category-based access control for the selected signaling category.

2. The method of claim 1, wherein the update procedure related to the RAN based area includes an RRC connection resume procedure.

3. The method of claim 1, wherein the signaling category corresponding to the initiation of the update procedure related to the RAN based area is different from a signaling category corresponding to other procedures among the one or more procedures.

4. The method of claim 1, wherein the barring information includes at least one of a barring factor, a barring time, or a bitmap.

5. The method of claim 1, wherein the barring information is broadcast through system information or transmitted through an RRC message on a dedicated control channel (DCCH).

6. The method of claim 1, wherein the network is one of an eNB, a gNB, a server, a mobility management entity (MME), an access and mobility management function (AMF), or a session management function (SMF).

7. The method of claim 1, wherein the wireless device is in communication with at least one of a user equipment, a network, and/or autonomous vehicles other than the wireless device.

8. A wireless device configured to operate in a wireless communication system, the wireless device comprising:
at least one transceiver;
at least one processor; and
at least one computer memory operably connectable to the at least one processor and storing instructions that, based on being executed by the at least one processor, perform operations comprising:
receiving, via the transceiver, barring information mapped to multiple signaling categories from a network,
wherein each of the multiple signaling categories corresponds to one or more procedures, and
wherein the one or more procedures includes one or more non-access stratum (NAS) procedures and one or more radio resource control (RRC) procedures;
initiating an update procedure related to a radio access network (RAN) based area, among the one or more procedures;
selecting, by a RRC layer of the wireless device, a signaling category, among the multiple signaling categories, corresponding to the initiation of the update procedure related to the RAN based area;

performing a category-based access control for the selected signaling category based on the barring information; and transmitting, to the network via the transceiver, a RRC message for the update procedure related to the RAN based area upon that the update procedure related to the RAN based area is not barred as a result of the category-based access control for the selected signaling category.

9. The wireless device of claim 8, wherein the update procedure related to the RAN based area includes an RRC connection resume procedure.

10. The wireless device of claim 8, wherein the signaling category corresponding to the initiation of the update procedure related to the RAN based area is different from a signaling category corresponding to other procedures among the one or more procedures.

11. The wireless device of claim 8, wherein the barring information includes at least one of a barring factor, a barring time, or a bitmap.

12. The wireless device of claim 8, wherein the barring information is broadcast through system information or transmitted through an RRC message on a dedicated control channel (DCCH).

13. The wireless device of claim 8, wherein the network is one of an eNB, a gNB, a server, a mobility management entity (MME), an access and mobility management function (AMF), or a session management function (SMF).

14. A wireless device configured to operate in a wireless communication system, the wireless device comprising:

at least one memory; and at least one processor, operably coupled to the at least one memory, wherein the at least one processor is configured to:

obtain barring information mapped to multiple signaling categories, wherein each of the multiple signaling categories corresponds to one or more procedures, and wherein the one or more procedures includes one or more non-access stratum (NAS) procedures and one or more radio resource control (RRC) procedures;

initiate an update procedure related to a radio access network (RAN) based area;

select, by a RRC layer of the wireless device, a signaling category, among the multiple signaling categories, corresponding to the initiation of the update procedure related to the RAN based area, among the one or more procedures;

perform the category-based access control for the selected signaling category based on the barring information; and generate a RRC message for the update procedure related to the RAN based area upon that the update procedure related to the RAN based area is not barred as a result of the category-based access control for the selected signaling category.

* * * * *